J. R. GAMMETER.
METHOD OF MAKING RUBBER CYLINDERS.
APPLICATION FILED NOV. 21, 1921.
1,405,998.
Patented Feb. 7, 1922.
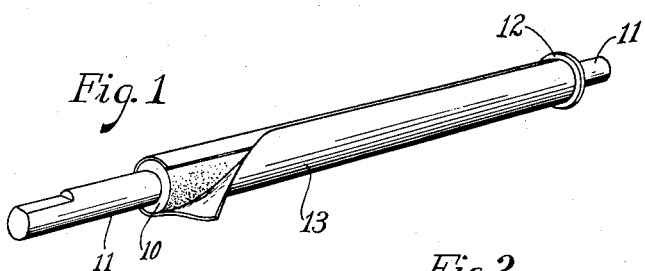
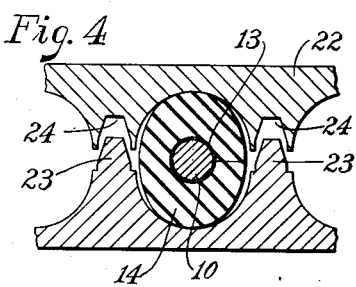
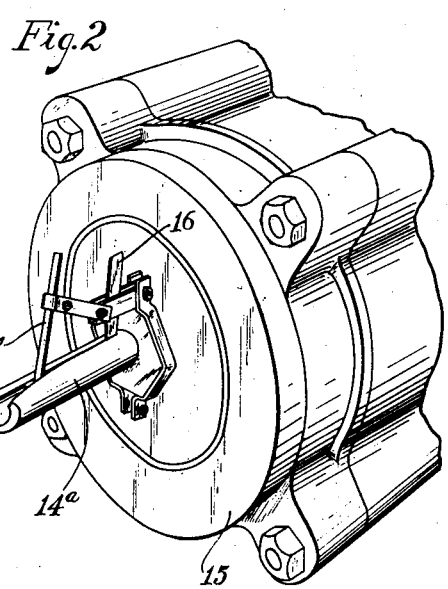
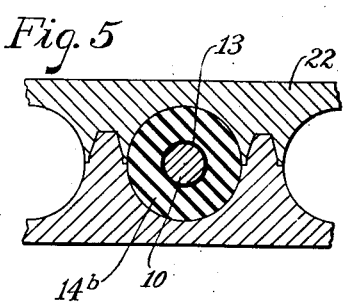
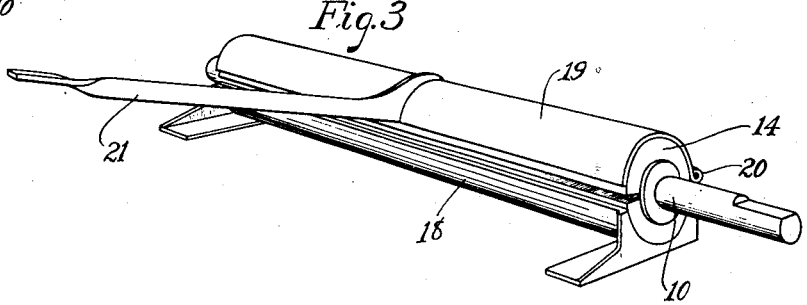
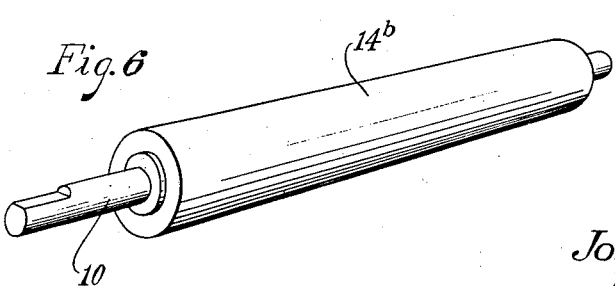
Inventor
John R. Gammeter:
By Robert M. Pierson
Atty.

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD OF MAKING RUBBER CYLINDERS.

1,405,998.  Specification of Letters Patent.  Patented Feb. 7, 1922.

Application filed November 21, 1921. Serial No. 516,665.

*To all whom it may concern:*

Be it known that I, JOHN R. GAMMETER, a citizen of the United States, residing at Akron, in the county of Summit and State of Ohio, have invented a certain new and useful Method of Making Rubber Cylinders, of which the following is a specification.

This invention relates to the art of making a tubular structure of plastic material such as rubber. Examples are the covering of wringer rolls and the formation of hollow cylinders of rubber from which fruit jar rings or gaskets are cut. My object is to obtain products of this nature free from imperfections and at a reduced cost as compared with prior methods.

Of the accompanying drawings, which illustrate different steps in my process and suitable apparatus for carrying out the same:

Fig. 1 is a perspective view of the mandrel or core of a wringer roll, with a wrapping of tie-gum thereon.

Fig. 2 is a perspective view of the discharge end of a tube machine with the rubber covering-stock protruding from its nozzle.

Fig. 3 is a perspective view of a clamping device with the work therein.

Figs. 4 and 5 are sectional views of the molding apparatus, with the work therein, showing the mold respectively in open and closed positions.

Fig. 6 is a perspective view of the finished roll.

In the drawings, 10 in Fig. 1 is a wringer-roll mandrel having a cylindrical middle portion, 11, 11 are the arbors on its ends, 12 is one of the end-plates swaged onto the inner ends of the arbors the other being omitted for clearness of illustration, and 13 is a thin layer of rubber "tie-gum," preferably of a semi-hard vulcanizing compound wrapped about the mandrel to insure the adhesion of the tubular cushion.

The blank 14 (Figs. 3 and 4), which I prefer to use, is a tubular piece of plastic rubber compound of elliptical section slit along one side in the plane of its minor axis and having walls which are relatively thin at and adjacent to this plane and relatively thick at and adjacent to the plane of the major axis. The blanks are formed by cutting sections of the desired length from a longer piece 14ª (Fig. 2) extruded from a tube machine 15, posterior to the die of which are located the slitting knife 16 and a spreader rod 17.

One of these C-shaped blanks is placed about a mandrel 10 having the tie-rubber layer 13 thereon, said layer and the lips of the blank being softened with a wiping of benzine, and the assembly is located in a pressing apparatus shown in Fig. 3. This apparatus comprises a fixed trough-shaped jaw 18 mounted on suitable standards and a second jaw 19 of similar shape hinged thereto at 20 and provided with an operating handle 21, these jaws enclosing between them a space of elliptical cross-section and serving when brought together to squeeze the blank 14 firmly upon the mandrel by pressure in the plane of the major axis of the ellipse and cause the lips of the blank to adhere, the slit in the blank being placed opposite the hinge and the squeezing action being progressive from the region of said hinge around to the slit.

The covered roll is then removed from the clamping device and placed in a two-part vulcanizing mold 22 as shown in Fig. 4, said mold being provided with mortising tongues 23 and grooves 24 to secure registration, and having a molding cavity of circular section. The cushion blank 14 is located with its major axis vertical, or transverse to the parting plane of the mold, so that clearances exist at the sides of the roll, between the cover blank 14 and the mold, for the escape of air at the parting plane when molding pressure is brought to bear. The mold with the work therein is then placed between the plates of a hot-plate vulcanizing press, which closes said mold as shown in Fig. 5, and the roll is vulcanized under molding pressure, after which the roll is removed and the fins or rands buffed off to bring it to the form shown in Fig. 6, wherein the rubber cushion or cover is designated 14ᵇ.

To make a hollow cylinder blank for jar rings, etc., a removable molding mandrel is employed.

The foregoing process may be varied in detail without departing from my invention.

I claim:

1. The method of making a molded tubular article which comprises extruding a plastic tubular blank of elliptical cross-section, and reducing the blank along the major axis of the ellipse by molding pressure exerted in the plane of said axis.

2. Steps in the method of molding tubular articles which comprise forming a plastic tubular blank of elliptical cross-section slit longitudinally along one side substantially in the plane of the minor axis of the ellipse, placing said blank about a core, and compressing the blank upon said core progressively around to the slit from the opposite side of the blank by pressure exerted in the general direction of the plane of the major axis.

3. The method of making a rubber tube which comprises forming a tubular blank slit along one side and having its opposite walls relatively thin at and adjacent to the plane of the slit, placing said blank about a mandrel, and molding and vulcanizing the blank on said mandrel under pressure exerted toward the mandrel in a plane transverse to the plane of the slit.

4. The method of making a hollow rubber cylinder which comprises extruding a tubular blank of elliptical cross-section having opposite walls which are relatively thick at and adjacent to the plane of the major axis of the ellipse, placing said blank about a cylindrical mandrel in a mold having a cylindrical molding cavity, with the major axis of the ellipse lying in the direction of the molding pressure, and molding and vulcanizing the article in said mold.

5. The method of making a hollow rubber cylinder which comprises forming a tubular blank of elliptical cross-section with opposite walls thickened at and adjacent to the plane of the major axis of the ellipse and slit along one of the thin-walled sides, placing said blank about a cylindrical mandrel in a two-part mold having a cylindrical molding cavity, with the minor axis of the blank substantially at the parting plane of the mold, closing the mold upon the blank and vulcanizing the article therein.

6. The method of making rubber-covered rolls which comprises extruding a tubular blank of elliptical cross-section and thickened walls at and adjacent to the plane of the major axis of the ellipse, placing said blank about a cylindrical mandrel having a layer of hard-vulcanizing tie-rubber thereon, placing the roll in a mold having a cylindrical cavity, with the major axis of the blank transverse to the parting plane of the mold, closing the mold upon the roll and vulcanizing the latter therein.

7. The method of making a rubber tube which comprises extruding from a tube-machine a length of blank-forming rubber of elliptical section having walls thickened at and adjacent to the plane of the major axis of the ellipse and slit along one side substantially in the plane of the minor axis, compressing a blank from said length in its elliptical form about a cylindrical mandrel by exerting pressure progressively around to the slit from the opposite side, placing the covered mandrel in a two-part mold having a cylindrical cavity, closing said mold by pressure in the plane of the major axis of the blank, and vulcanizing the article in the mold.

In witness whereof I have hereunto set my hand this 11th day of November, 1921.

JOHN R. GAMMETER.